United States Patent [19]

Paolino

[11] Patent Number: 5,501,078
[45] Date of Patent: Mar. 26, 1996

[54] SYSTEM AND METHOD FOR OPERATING AN INTEGRATED GAS TURBINE AND CRYOGENIC AIR SEPARATION PLANT UNDER TURNDOWN CONDITIONS

[75] Inventor: Gerald A. Paolino, Lancaster, N.Y.

[73] Assignee: Praxair Technology, Inc., Danbury, Conn.

[21] Appl. No.: 427,364

[22] Filed: Apr. 24, 1995

[51] Int. Cl.⁶ .................................................. F25J 3/00
[52] U.S. Cl. ........................ 62/21; 62/24; 62/37; 62/38; 62/30; 60/39.12
[58] Field of Search ............................ 62/21, 24, 37, 62/38, 39, 30; 60/39.12

[56] References Cited

U.S. PATENT DOCUMENTS

| | | | |
|---|---|---|---|
| 2,520,862 | 10/1946 | Swearingen | 62/123 |
| 3,729,298 | 4/1973 | Anderson | 62/39 |
| 3,731,495 | 5/1973 | Coveney | 62/39 |
| 4,224,045 | 9/1980 | Olszewski et al. | 62/30 |
| 4,250,704 | 2/1981 | Brückner et al. | 60/39.12 |
| 4,557,735 | 12/1985 | Pike | 55/26 |
| 4,631,915 | 12/1986 | Frewer et al. | 60/39.12 |
| 4,806,136 | 2/1989 | Kiersz et al. | 62/18 |
| 5,081,845 | 1/1992 | Allam et al. | 62/24 |
| 5,224,336 | 7/1993 | Agrawal et al. | 62/37 |
| 5,251,451 | 10/1993 | Xu et al. | 62/25 |
| 5,257,504 | 11/1993 | Agrawal et al. | 62/24 |
| 5,421,166 | 6/1995 | Allam et al. | 62/24 |
| 5,437,161 | 8/1995 | Chretien | 62/37 |

*Primary Examiner*—Christopher Kilner
*Attorney, Agent, or Firm*—Stanley Ktorides

[57] ABSTRACT

A gas turbine/air separation apparatus operates at both a design point and a turndown point and includes a gas turbine for providing pressurized air and an air separation plant which receives the pressurized air. The air separation plant produces an oxygen-bearing fluid at a first purity and first pressure when the pressurized air is at a design point pressure, and produces the oxygen-bearing fluid at a second purity and second pressure when the pressurized air is at a turndown pressure, the second purity and second pressure being lower than the first purity and first pressure, respectively. A compressor compresses the oxygen-bearing fluid to a design point pressure and feeds the compressed oxygen-bearing fluid to the use point. A controller is responsive to a turndown state for causing the gas turbine to provide the pressurized air at the turndown pressure and causes the air separation plant to respond thereto by producing and supplying the oxygen-bearing fluid at the second purity and second pressure to the compressor means.

7 Claims, 1 Drawing Sheet

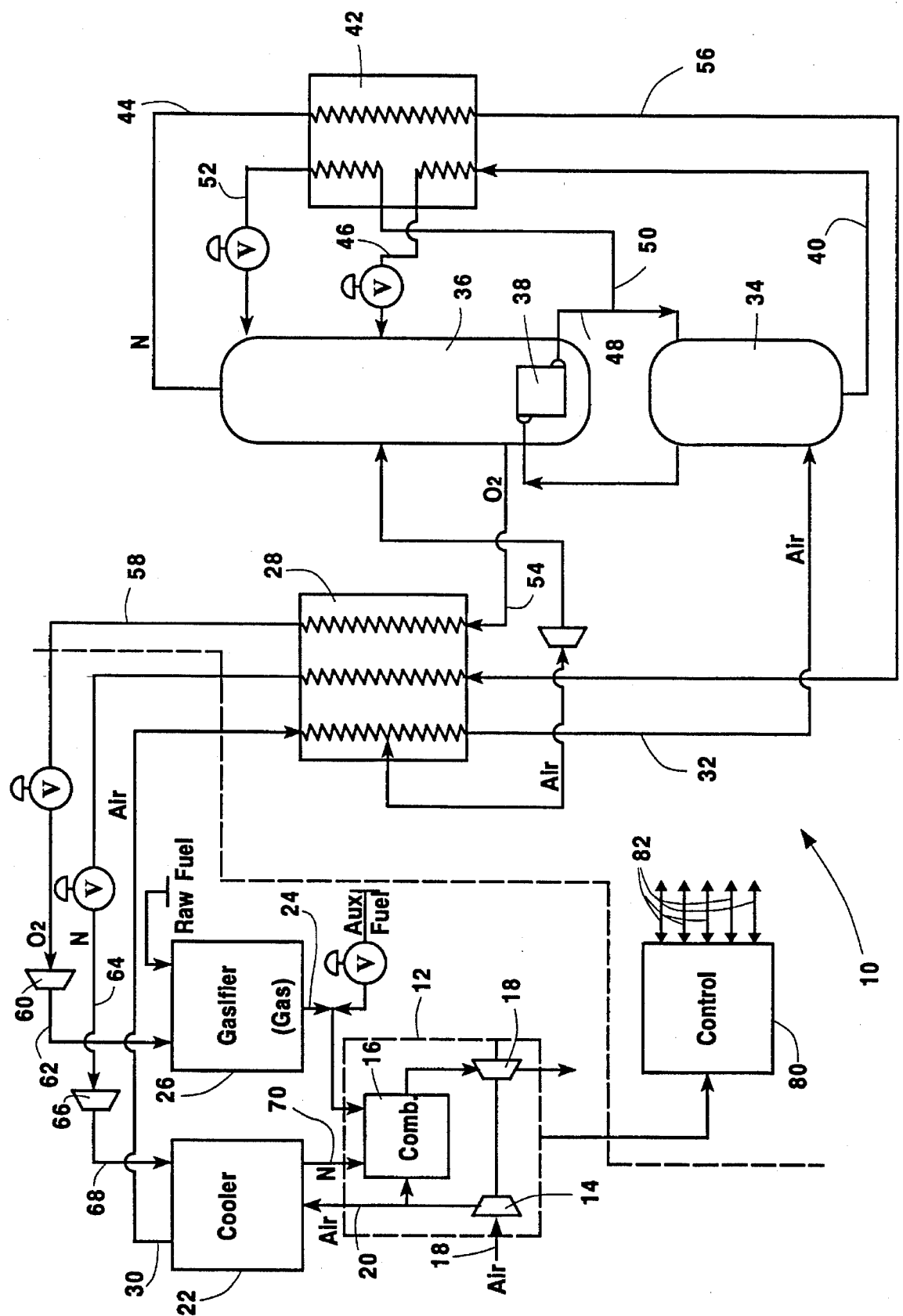

5,501,078

SYSTEM AND METHOD FOR OPERATING AN INTEGRATED GAS TURBINE AND CRYOGENIC AIR SEPARATION PLANT UNDER TURNDOWN CONDITIONS

FIELD OF THE INVENTION

This invention relates to integrated gas turbine/air separation plant installations and, more particularly, to a method for operation of such an installation under turndown conditions.

BACKGROUND OF THE INVENTION

Gas turbine power generation systems that utilize fuels such as coal or low grade oils, use a gasifier to convert the raw fuel to gaseous fuels suitable for the gas turbine. The gasifier unit requires oxygen for the fuel conversion. The required oxygen is supplied from an air separation unit that is advantageously integrated with the gas turbine, as for example shown in U.S. Pat. No. 4,224,045 to Olszewski et al. That patent discloses a system for low temperature fractionation of air which employs a higher pressure rectification column having its upper end in heat exchange communication with a lower end of a lower-pressure rectification column. Cold compressed air is separated into oxygen-rich and nitrogen-rich liquids in the higher-pressure column. Those liquids are transferred to the lower-pressure column for separation into nitrogen-rich and oxygen-rich products.

Large quantities of energy are required to compress the feed air in the air separation plant. The prior art teaches a number of techniques for energy savings in such installations. Coveney, in U.S. Pat. No. 3,731,495, discloses an energy reduction system which uses a nitrogen-quenched power turbine. A portion of the compressed feed air is mixed with fuel and combusted. The hot combustion mixture is then quenched with waste nitrogen-rich gas from the lower-pressure column and the resulting gaseous mixture is expanded in a power turbine. The expansion provides energy to compress the feed air to the system. The aforesaid Olszewski et al. U.S. Pat. No. 4,224,045 describes an improvement of the Coveney system wherein waste nitrogen is compressed prior to turbine expansion, thereby providing an increase in energy efficiency.

In an integrated gas turbine/air separation plant, the operation of the gas turbine takes precedence over that of the air separation unit. As is known to those skilled in the art, the gas turbine is employed to drive an electric generator which produces power that is distributed to users over a connected network. At times, the gas turbine may need to enter a turndown mode in response to a decrease in power demand. The gas turbine turndown mode may or may not correspond to a turndown operation of the air separation unit which is, in turn, related to the operation of the gasifier unit.

When a gas turbine is turned down, the operating pressure of the gas turbine is lowered, thereby causing a decrease in the pressure of the air feed from the turbine to the air separation unit. When the air separation unit air feed pressure is lowered, the operating pressure must be lowered and, as a result, the air separation unit produces less product. Further, the pressure levels of the oxygen and nitrogen products will be reduced at the exit of the air separation unit. When required product pressures at the use point are the same at turndown as they are at the design point of the system, the turndown operating point will exhibit significantly higher compression ratio requirements for the product compressors. This will result in higher capital cost for the system due to the increased requirements placed upon the product compressors.

To minimize the affect of gas turbine turndown on the operation of an air separation unit, the compression equipment and air separation unit could be designed to handle the higher pressure differentials expected under turndown conditions. However, this would require that the equipment be oversized for the design point and would result in inefficient operation. For instance, a gas turbine that is operating in a turndown mode may deliver the feed air to the air separation unit at a pressure that is 30 to 50 pounds per square inch absolute (psia) lower than the design point operating pressure. In order to deliver product gas from the air separation unit at a constant pressure over the possible operating range of the gas turbine, product compression equipment must be capable of compressing the product for the case with the highest pressure ratio—which is at the turndown operation. To the extent that that pressure ratio can be minimized, capital costs of the compression equipment will be reduced.

Accordingly, it is an object of the invention to provide an improved method and apparatus for operation of an integrated gas turbine/air separation plant wherein compression pressure ratios experienced under turndown conditions are reduced.

It is a further object of this invention to provide an integrated gas turbine/air separation plant wherein reduced turndown compression ratios are achieved by supplying lower purity oxygen to the use point.

SUMMARY OF THE INVENTION

An integrated gas turbine/air separation apparatus operates at both a design point and a turndown point and includes a gas turbine for providing pressurized air and an air separation plant which receives the pressurized air. The air separation plant produces an oxygen-bearing fluid at a first purity and first pressure when the pressurized air is at a design point pressure, and produces the oxygen-bearing fluid at a second purity and second pressure when the pressurized air is at a turndown pressure, the second purity and second pressure being lower than the first purity and first pressure, respectively. A compressor compresses the oxygen-bearing fluid to a design point pressure and feeds the compressed oxygen-bearing fluid to a use point. A controller is responsive to a turndown state to cause the gas turbine to provide the pressurized air at the turndown pressure and to also cause the air separation plant to respond thereto by producing and supplying the oxygen-bearing fluid at the second purity and second pressure to the compressor means.

BRIEF DESCRIPTION OF THE DRAWING

The sole FIGURE is a schematic flow sheet of a combined gas turbine/air separation unit that embodies the invention hereof.

DETAILED DESCRIPTION OF THE INVENTION

Electric power generation systems must be capable of operation at low demand or turndown conditions. Integrated gasification systems that combine a gas turbine, air separation plant, and raw fuel gasifier must be capable of operation at such turndown conditions and further, each separate unit must be operable at turndown conditions. However, it may be that each unit can be operated at different turndown conditions (in terms of operating capacity and/or process conditions) during the reduced demand time period. This invention takes advantage of the fact that during turndown when the gas turbine requires less fuel, a gasifier and air plant are also operated at a lower capacity as needed to supply the fuel. However, the oxygen supplied to the gasifier is at a lower purity thereby providing compression equipment savings.

A cryogenic air separation unit (ASU) which supplies the feed oxygen to the gasifier employs a double column fractionation process and supplies the lowered oxygen purity during turndown conditions. When the oxygen purity is changed in the air separation unit, the boiling pressure of the oxygen changes at a given temperature. More specifically, as the oxygen purity decreases, its boiling temperature also decreases which, in turn, decreases the condensing temperature of the fluid used to boil the oxygen (air, nitrogen, etc.). For example, at a temperature of 102° K., liquid oxygen with a purity of 95% will boil at a pressure of 44.1 psia, while liquid oxygen with a 90% purity will boil at a pressure of 45.8 psia. The increased boiling pressure of the lower purity oxygen lessens the pressure ratio required to be handled by a downstream compressor that provides the feed oxygen for the gasifier. As a result, design requirements for the downstream compressor, using a lower purity oxygen feed, are less stringent than those which would be present if a higher purity oxygen feed were employed.

The air separation process carried out within ASU 10 is conventional and the methods for controlling its output oxygen product purity are well known. For a further description of the process employed within ASU 10 to provide both oxygen and nitrogen streams, see U.S. Pat. No. 4,224,045 to Olszewski et al.

Referring to the Figure, double column ASU 10 is integrated with a gas turbine 12. Gas turbine 12 comprises an air compressor 14, a combustor 16, and a turbine/expander 18 which, in turn, drives an electric generator (not shown). Compressor 14 compresses an air stream received via conduit 18 and supplies the compressed air stream, via conduit 20, to combustor 16 and prepurifier/cooler module 22. A fuel feed is passed to combustor 16 via conduit 24 from a gasifier 26. Optionally, an auxillary fuel can be combined with from the gasifier fuel and fed to gas turbine 12.

Within combustor 16, the compressed airfeed and fuel are combusted and the combustion products are fed to turbine/expander 18 to drive both compressor 14 and the attached generator. The exhaust from turbine/expander 18 can either be vented to the atmosphere or used to generate steam in a heat recovery unit.

The compressed air fed to purifier/cooler module 22 is cleaned of contaminents such as $CO_2$, $H_2O$ and hydrocarbons, cooled and fed to a heat exchanger 28, via conduit 30. There the compressed air is cooled to near its dew point against the products from the cryogenic process. The cooled air stream exits via conduit 32 and is fed to a lower column 34 where the initial air separation takes place. There the compressed air feed is separated into a nitrogen rich gas at the top of lower column 34 and an oxygen enriched fluid at its bottom. The nitrogen rich gas is fed to reboiler-condensor 38 where it is condensed and enters liquid return 48 to the top of lower column 34.

The condensation action causes a boiling of oxygen at the bottom of upper column 36. Upon a decrease in pressure (under turndown conditions) of the nitrogen rich gas flowing into reboiler-condensor 38, the resulting oxygen boiling pressure also drops, which reduced pressure is manifest in the oxygen flow exiting via conduit 54.

Bottom liquid from lower column 34 is withdrawn via conduit 40 and is subcooled in heat exchanger 42 against nitrogen vapor fed from upper column 36 via conduit 44. The resulting subcooled bottom liquid is fed as reflux via conduit 46 to upper column 36. Likewise, a portion of the overhead vapor in lower column 34 that is condensed in reboiler condensor 38 is withdrawn from lower column feed line 48 and is fed, via conduit 50, to heat exchanger 42. Within heat exchanger 42, the liquid stream is subcooled against the overhead nitrogen vapor from upper column 36 before being added to upper column 36 as a reflux, via conduit 52.

Upper column 36 produces an oxygen product at the bottom of the column which is output via conduit 54 to heat exchanger 28. Similarly, upper column 36 provides a gaseous nitrogen product via conduit 44 to heat exchanger 42 and from there, via conduit 56, to heat exchanger 28. The oxygen and nitrogen products are warmed within heat exchanger 28 to ambient temperature against the incoming compressed air before exiting the cryogenic process. The warmed oxygen exits heat exchanger 28 via conduit 58, is compressed in compressor 60 and is fed via conduit 62 to gasifier 26. Nitrogen exits heat exchanger 28 via conduit 64, is compressed in compressor 66, and is fed via conduit 68 to prepurifier/cooler 22 where it is heated versus the extracted air from the gas turbine. Thereafter, the nitrogen is fed via conduit 70 to combustor 16.

Under turndown conditions, a controller 80 responds to a decrease in power demand by putting gas turbine 12 into a turndown mode. At the same time, a plurality of additional outputs are fed by controller 80 to various control functions (not shown) via outputs 82 to cause ASU 10 to enter the turndown mode. Table 1 below summarizes the operating pressures for ASU 10 for a design point and two turndown conditions (i.e. A and B).

TABLE 1

| STREAM NUMBER | DESIGN POINT 95% $O_2$ | TURNDOWN A 95% $O_2$ | TURNDOWN B 90% $O_2$ |
|---|---|---|---|
| 30 | 160 psia | 130 psia | 130 psia |
| 50 | 155 psia | 127.5 psia | 127.5 psia |
| 44 | 47.1 psia | 36.7 psia | 39.7 psia |
| 64 | 41.1 psia | 33.5 psia | 36.5 psia |
| 68 | 275 psia | 245 psia | 245 psia |
| 54 | 48.1 psia | 37.4 psia | 40.4 psia |
| 58 | 43.1 psia | 34.9 psia | 37.9 psia |
| 62 | 1000 psia | 970 psia | 970 psia |

For the design point it has been assumed that the liquid oxygen purity at the bottom of upper column 36 is 95% and that the air feed in conduit 30 is 160 psia. To illustrate the affect of varying oxygen purity at a turndown design point, the turndown design point has been defined as a case where air feed pressure is 130 psia (stream 30) and the production rate of air separation unit 20 is 70% of the design flow rate at the design point. For turndown case A, the oxygen product at the bottom of upper column 36 is 95%. For turndown case B, the oxygen product at the bottom of upper column 36 is 90%. Pressure drops assumed for the design point case have been ratioed using accepted design rules to predict pressure drops at the two turndown points. The operating pressures shown in Table 1 are consistent with a typical design and arrangement of equipment in accordance with industry practices.

Turndown case A assumes that oxygen feed to compressor 60 is maintained at 95% purity. Under such conditions, the pressure in conduit 58 is 34.9 psia whereas the output pressure from compressor 60 is 970 psia, giving a pressure ratio across compressor 60 of 27.8. If, however, turndown case B is considered, wherein 90% oxygen is fed to compressor 60, the feed stream in conduit 58 to compressor 60 is 37.9 psia. Thus, for an identical output pressure from compressor 60, a compression ratio results of 25.6. Turndown case B therefore provides an approximate 8% reduction in pressure ratio across compressor 60 when using 90% purity oxygen versus the use of 95% oxygen. As a result, the design requirements for compressor 60 are accordingly less stringent. Likewise, similar benefits are obtained for nitrogen compressor 66.

Turndown case B provides lower purity oxygen to be fed at the turndown pressure to gasifier 26, enabling the production of fuel therein. Since less fuel is required under turndown conditions, the amount of fuel fed via conduit 24 to combustor 16 is reduced, thereby accommodating the use of lower purity oxygen being fed via conduit 62. It should be noted that the gasifier unit and the air separation unit may not be reduced in capacity to the same degree as the gas turbine. That is, the gas turbine can be reduced in capacity to a greater extent than the gasifier and the difference in fuel requirement can be accommodated by reducing the supply of auxilliary fuel.

Thus, it can be seen that the output pressure of oxygen in conduit 54 is directly related to the inlet air pressure in conduit 32. Assuming that there is no change in purity of the oxygen flowing in conduit 54, the decreased nitrogen gas pressure in reboiler-condensor 38 will result in a lower pressure oxygen outflow in conduit 54. As a result, the pressure differential across compressor 60 experiences an increase as compressor 60 is required to maintain a constant pressure output.

By changing the purity of the oxygen at the bottom of upper column 36 from 95% to 90%, an increase of 3 psi is achieved for the suction pressure of both compressors 60 and 66. As above indicated, this occurs as a result of the fact that when oxygen purity is lowered, its boiling pressure increases, causing an increased oxygen pressure to be manifest in conduit 54 and an increased nitrogen pressure to be manifest in conduit 44. These increased pressures decrease the compression ratio across compressors 60 and 66 at the turndown point.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. Apparatus operating at both a design point and a turndown point, said apparatus comprising:

gas turbine means for providing pressurized air;

gasifier means for producing and feeding fuel to said gas turbine means;

air separation means coupled to said gas turbine means for receiving said pressurized air via an air feed, for producing an oxygen-bearing fluid at a first purity and first pressure when said air feed is at a design point pressure, and for producing said oxygen-bearing fluid at a second purity and second pressure when said air feed is at a turndown pressure, said second purity and second pressure being lower than said first purity and first pressure, respectively;

compression means for compressing said oxygen-bearing fluid to about a design point pressure and for feeding said compressed oxygen-bearing fluid to said gasifier means; and control means responsive to a turndown state for causing said gas turbine means to provide said pressurized air to said air separation means at said turndown pressure and for further causing said air separation means to respond thereto by producing and supplying said oxygen-bearing fluid at said second purity and second pressure to said compression means.

2. The apparatus as recited in claim 1, wherein said air separation means creates said oxygen-bearing fluid by condensing oxygen through use of a nitrogen rich gas in heat transfer contact therewith.

3. The apparatus as recited in claim 1, wherein said gas turbine means further receives separately controllable carboneacous material as a fuel.

4. The apparatus as recited in claim 1, wherein said second pressure is higher than a third pressure that would result if said control means operated said air separation means to respond to said pressurized air at turndown pressure by continuing to produce said oxygen-bearing fluid at said first purity level, whereby said compression means is enabled to operate at a lesser pressure differential during said turndown state.

5. A method for operating an apparatus at both a design point and a turndown point, said apparatus including gas turbine means, air separation means, compressor means, gasifier means and control means, said method comprising the steps of:

operating said gas turbine means to provide pressurized air;

feeding said pressurized air to said air separation means via an air feed, and causing said air separation means to produce an oxygen-bearing fluid at a first purity level and first pressure when said air feed is at a design point pressure, and to produce said oxygen-bearing fluid at a second purity level and second pressure when said air feed is at a turndown pressure, said second purity level and second pressure being lower than said first purity level and first pressure, respectively;

compressing said oxygen-bearing fluid to about a design point pressure;

feeding said compressed oxygen-bearing fluid to said gasifier means;

feeding a fuel from said gasifier means to the gas turbine means to power said gas turbine means; and operating said control means in response to a turndown state to cause said gas turbine means to provide said pressurized air at said turndown pressure and to further cause said air separation means to respond thereto by producing and supplying to said compression means said oxygen-bearing fluid at said second purity level and second pressure.

6. The method as recited in claim 5, wherein said air separation means creates said oxygen-bearing fluid by condensing oxygen through use of a nitrogen rich gas in heat transfer contact therewith.

7. The method as recited in claim 5, further comprising the step of:

feeding a separately controllable carboneacous material as a fuel suitable to said gas turbine means, in addition to said fuel from said gasifier means.

\* \* \* \* \*